United States Patent
Lee

(10) Patent No.: US 7,161,717 B2
(45) Date of Patent: Jan. 9, 2007

(54) SELF-PROPELLED IMAGE READ MODULE

(75) Inventor: Pen-Jung Lee, Tao Yuan Hsien (TW)

(73) Assignee: Teco Image Systems Co., Ltd., Taipei (TW)

(*) Notice: Subject to any disclaimer, the term of this patent is extended or adjusted under 35 U.S.C. 154(b) by 935 days.

(21) Appl. No.: 10/118,014

(22) Filed: Apr. 9, 2002

(65) Prior Publication Data

US 2003/0189734 A1    Oct. 9, 2003

(51) Int. Cl.
*H04N 1/04* (2006.01)

(52) U.S. Cl. .............. 358/497; 358/487; 358/483; 358/474; 358/505; 358/506; 355/57; 355/60; 355/66; 355/67; 355/71; 399/32; 399/36; 399/202; 399/211

(58) Field of Classification Search ............... 358/497, 358/487, 474, 483, 505, 506; 399/32, 36, 399/202, 211; 355/57, 60, 66, 67
See application file for complete search history.

(56) References Cited

U.S. PATENT DOCUMENTS

| | | | |
|---|---|---|---|
| 6,473,206 B1* | 10/2002 | Fujimoto et al. | 358/497 |
| 6,667,469 B1* | 12/2003 | Tregoning | 250/208.1 |
| 6,888,651 B1* | 5/2005 | Lee | 358/497 |

* cited by examiner

*Primary Examiner*—Joseph R. Pokrzywa
*Assistant Examiner*—Vu B. Hang
(74) *Attorney, Agent, or Firm*—Rosenberg, Klein & Lee

(57) ABSTRACT

The present invention provides a self-propelled image read module, which comprises a sensor, a guide rod, a motor, a gear set, and a belt. The guide rod is fixed on a base of a scanner. The sensor is slidably matched on the guide rod. The motor is disposed at one side of the sensor. The gear set is connected to the motor. The belt is fixed on the base. The belt passes through between and contacts a transmission wheel and an idle wheel of the gear set. Thereby, a scanner's image read module of simple assembly, low cost, and small size is formed.

5 Claims, 5 Drawing Sheets

SELF-PROPELLED IMAGE READ MODULE

FIELD OF THE INVENTION

The present invention relates to a self-propelled image read module and, more particularly, to a scanner's image read module of simple assembly, low cost, and small size.

BACKGROUND OF THE INVENTION

Nowadays, scanners have become basic equipments of most computer's users. Both texts and pictures can be placed on scanners to be faithfully read in. The principle of scanner is very simple. Part of a document (manuscript) is illuminated by light, and the reflected light is read to obtain the image of this part. Additionally, the scanned image can be read in an image processing software for adjustment. If the scanned one is a printed matter, an optical character recognition (OCR) software can also be used to convert the printed matter into a text stored in a computer.

As shown in FIG. 1, a sensor 10a (e.g., a charge-coupled device (CCD) or a contact image sensor (CIS)) is disposed inside a prior art scanner. An axle sleeve 11a and a belt clamping seat 12a are disposed at the bottom of the sensor 10a. The axle sleeve 11a is sleeved onto and matched with a guide rod 13a. The belt clamping seat 12a can be clamped on a belt 14a, which uses a motor (not shown) as the power source. A gear set (not shown) disposed inside the scanner is used for transmitting power of the motor to the belt 14a so that the sensor 10a can be driven by the belt 14a to move on the guide rod 13a. The sensor 10a can thus move along the scanning direction to perform the scanning action.

However, the gear set of the above prior art image read module occupies much space, and uses many components, resulting in complicated assembly, high cost, and large size of the scanner and thus not conforming to the compactness requirement of present products.

Accordingly, the above image read module has drawbacks and inconvenience in practical use. The present invention aims to resolve the problems in the prior art.

SUMMARY OF THE INVENTION

The primary object of the present invention is to provide a self-propelled image read module, wherein the assembly of a motor is integrated with a sensor to reduce the occupied space of a gear set and decrease the number of components, thereby having the advantages of simple assembly, low cost, and small size.

To achieve the above object, the present invention provides a self-propelled image read module, which comprises a sensor, a guide rod, a motor, a gear set, and a belt. The guide rod is disposed below the sensor and fixed on a base. The sensor is slidably matched on the guide rod. The motor is disposed at one side of the sensor. The gear set comprises a plurality of gears, a transmission wheel, and at least an idle wheel. The gear set is connected to the motor. The belt is fixed on the base. The belt passes through between and contacts the transmission wheel and the idle wheel.

The various objects and advantages of the present invention will be more readily understood from the following detailed description when read in conjunction with the appended drawing, in which:

DETAILED DESCRIPTION OF THE PREFERRED EMBODIMENTS

Figure 1:
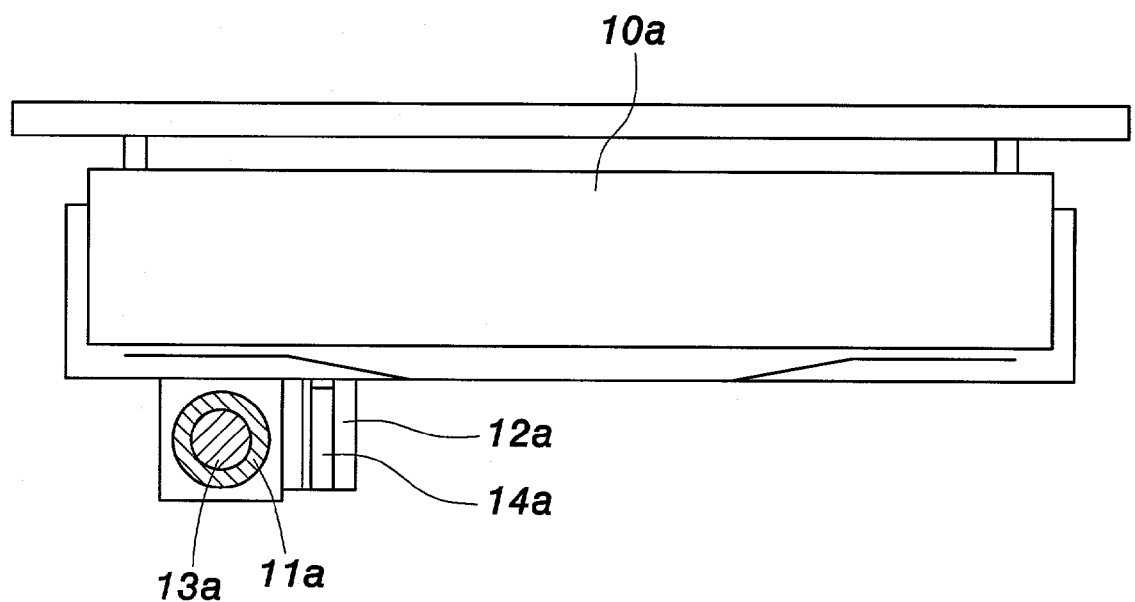
FIG. 1 is a plan view of an image read module in the prior art.
Figure 2:
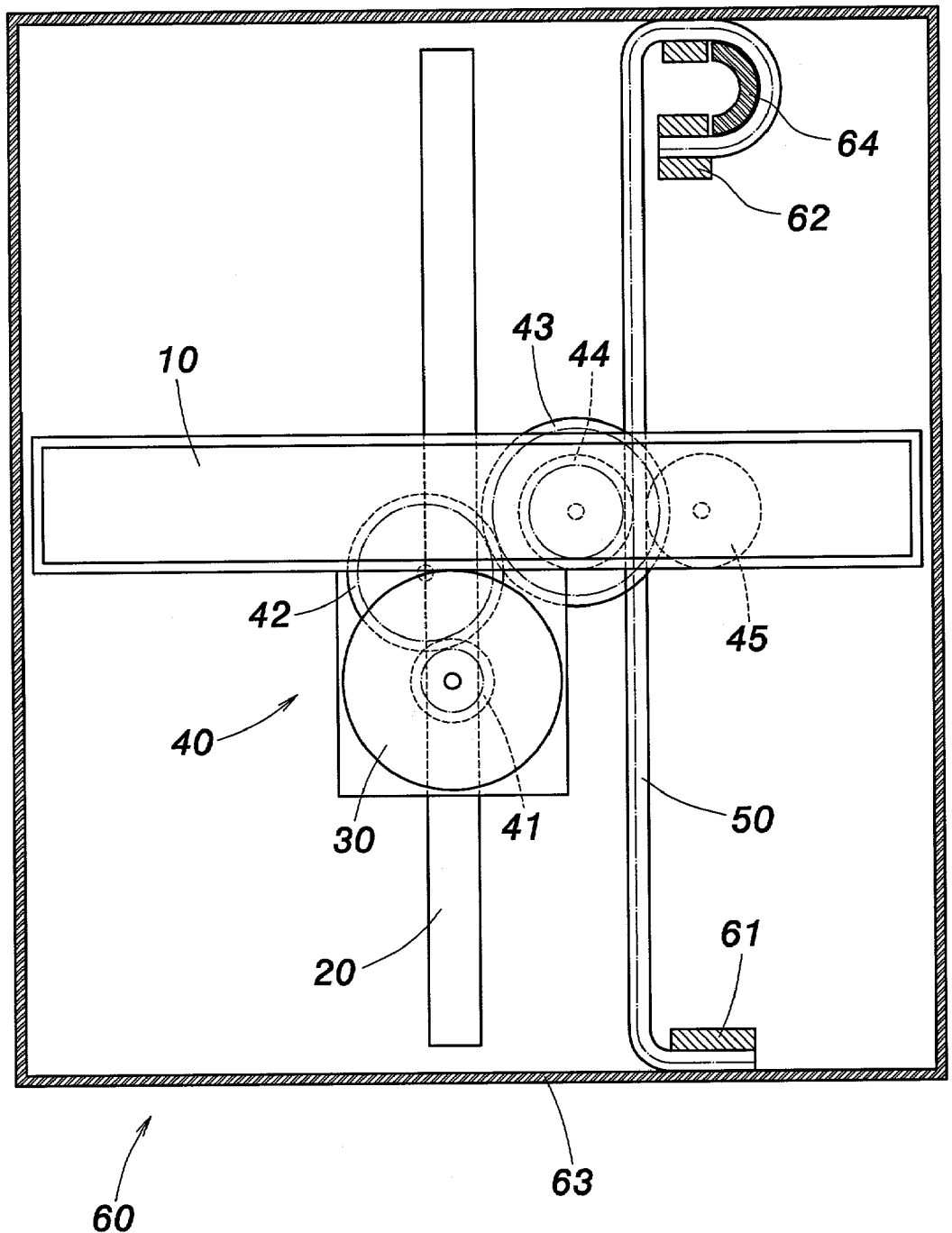
FIG. 2 is a top view of an image read module of the present invention.
Figure 3:
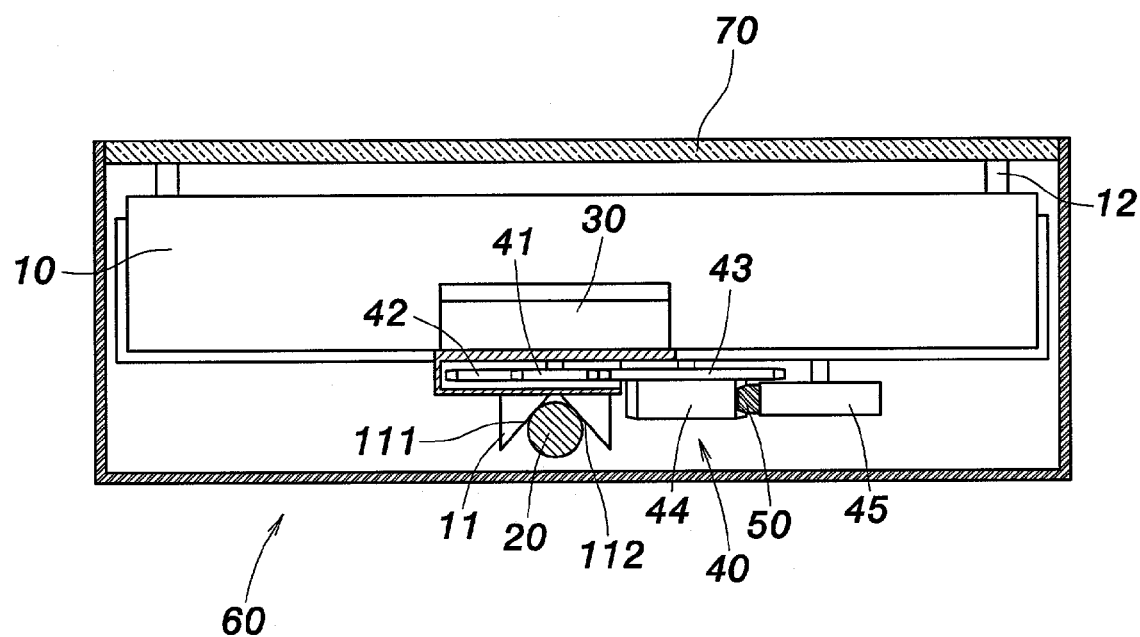
FIG. 3 is a front view of an image read module of the present invention.

As shown in FIGS. 2 and 3, the present invention provides a self-propelled image read module, which comprises a sensor 10, a guide rod 20, a motor 30, a gear set 40, and a belt 50. The sensor 10 is movably disposed on a base 60 of a scanner. The sensor 10 can be a CCD or a CIS. A guide rack 11 is disposed at the bottom of the sensor 10. The bottom of the guide rack 11 is inversely V-shaped to form two bevels 111 and 112.

The guide rod 20 is disposed below the sensor 10. The guide rod 20 is properly fixed on the base 60 of the scanner. The guide rack 11 is directly placed on the guide rod 20 to let the two bevels 111 and 112 contact the guide rod 20. The sensor 10 can thus be slidably matched on the guide rod 20. The sensor 10 can move along the scanning direction through guidance of the guide rod 20 to perform the scanning action.

Figure 4:
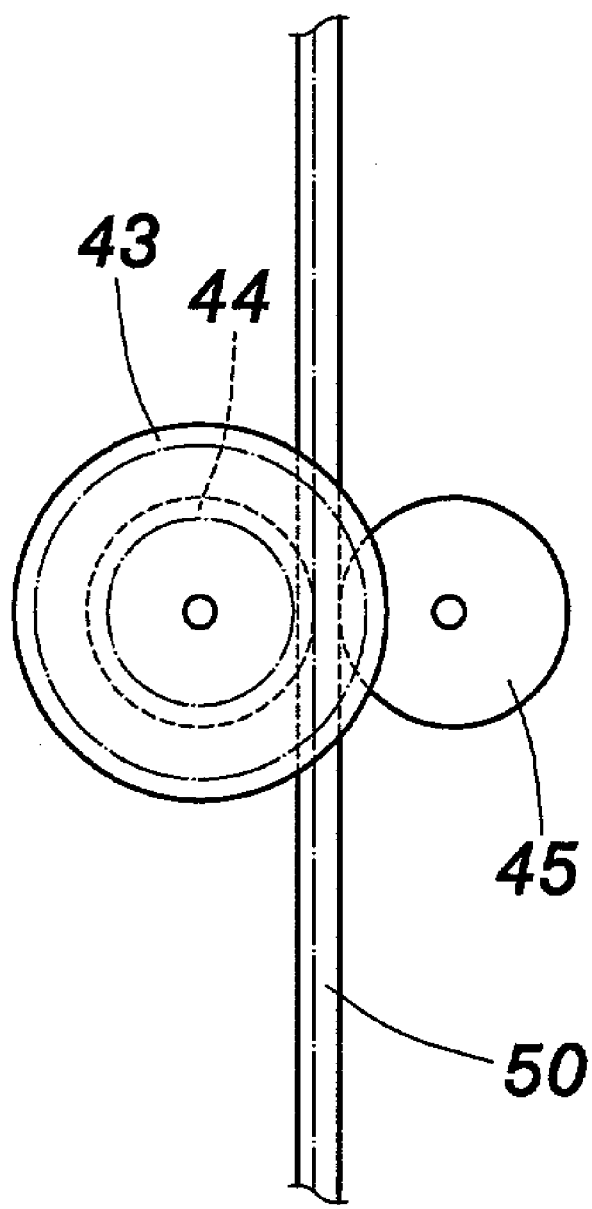
FIG. 4 is a plan view showing the connection of a transmission wheel, an idle wheel, and a belt of the present invention.

The motor 30 is fixedly disposed at one side of the sensor 10, and is properly connected to the gear set 40. The gear set 40 is a deceleration gear set, which comprises a first gear 41, a second gear 42, a third gear 43, a transmission wheel 44, and an idle wheel 45. The first gear 41 is connected to a power output shaft of the motor 30. The second gear 42, the third gear 43, the transmission wheel 44, and the idle wheel 45 are pivotally disposed on the sensor 10. The second gear 42 meshes the first gear 41, and the third gear 43 also meshes the second gear 42. The transmission wheel 44 coaxially disposed with the third gear 43 to make synchronous rotation so that the power of the motor 30 can be transmitted in order via the first gear 41, the second gear 42, and the third gear 43 to the transmission wheel 44. The idle wheel 45 and the transmission wheel 44 are symmetrically disposed left and right. A predetermined gap is preserved between the transmission wheel 44 and the idle wheel 45 so that the belt 50 can pass through between them, as shown in FIG. 4.

Figure 5:
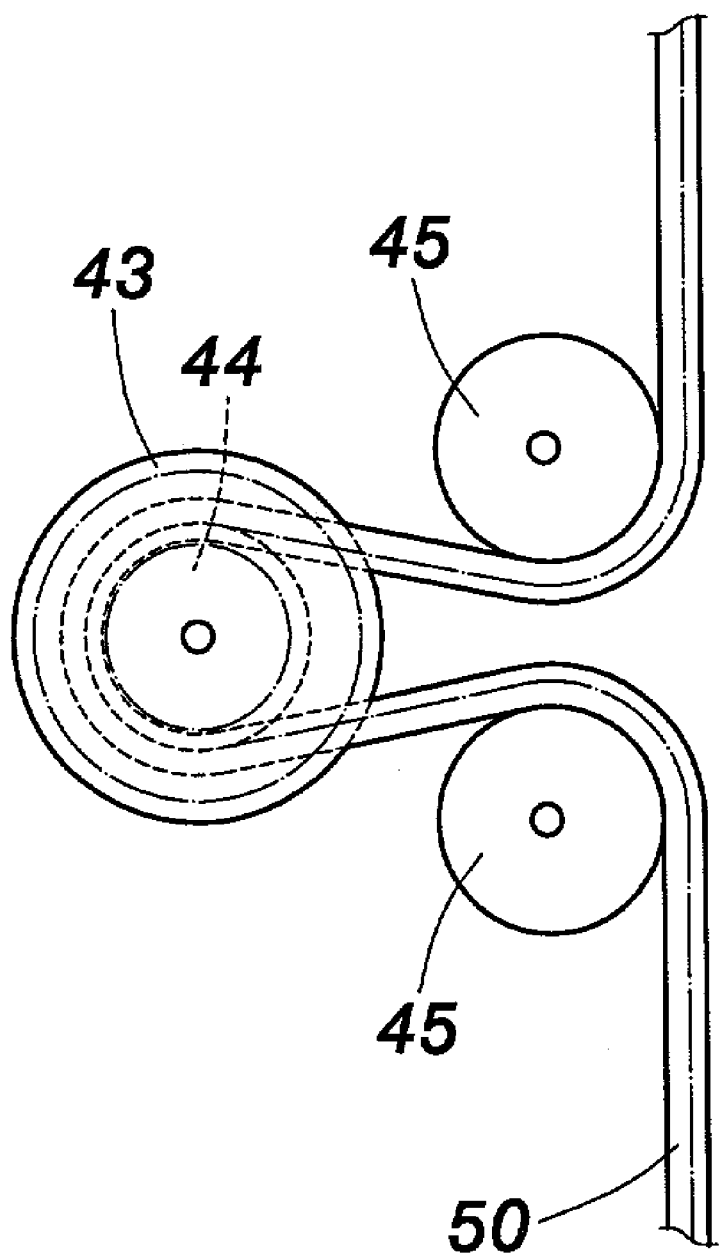
FIG. 5 is a plan view showing another type of connection of a transmission wheel, an idle wheel, and a belt of the present invention.

The belt 50 is disposed below the sensor 10. Two ends of the belt 50 are properly fixed on the base 60 of the scanner. The belt 50 is parallel to the guide rod 20. A first belt clamping seat 61 and a second belt clamping seat 62 can be directly formed on the base 60 by means of mold ejection so that one end of the belt 50 can be clamped between the first belt clamping seat 61 and a sidewall 63 of the base 60. An elastic clamping seat 64 is disposed adjacent to the second belt clamping seat 62. The elastic clamping seat 64 can be directly formed on the base 60 by means of mold ejection, or can be assembled with elastic parts like springs. The other end of the belt 50 can be elastically clamped between the second belt clamping seta 62 and the elastic clamping seat 64. The belt 50 passes through between and contacts the transmission wheel 44 and the idle wheel 45, and contacts the transmission wheel 44 and the idle wheel. In the present invention, it is also feasible that two idle wheels 45 are provided, as shown in FIG. 5. The belt 50 passes through between and contacts the transmission wheel 44 and the two idle wheels 45. A self-propelled image read module of the present invention is thus formed.

A glass 70 is disposed above the sensor 10. The glass 70 is fixedly disposed above the base 60 of the scanner. A slide piece 12 of the sensor 10 abuts against the glass 70 to control the focus length and rub the glass 70 for performing the scanning action.

As shown in FIG. 2, when the motor 30 is driven to rotate, the power of the motor 30 can be transmitted in order via the first gear 41, the second gear 42, and the third gear 43 to the transmission wheel 44. When the transmission wheel 44 rotates, it can make relative motion with respect to the belt 50 to lead the sensor 10 move on the guide rod 20. The sensor 10 thus moves along the scanning direction to perform the scanning action.

To sum up, in the present invention, the assembly of the motor is integrated with the sensor 10 to reduce the occupied space of the gear set 40. As compared to the prior art, the image read module of the present invention saves many components like a half of belt and many belt wheels. Moreover, the clamping seats 61, 62, and 64 can be directly formed on the base 60 by means of mold ejection. The present invention has the advantages of simple assembly, low cost, and small size.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A self-propelled image read module, comprising:
   a sensor;
   a guide rod disposed below said sensor and fixed on a base, said sensor being slidably matched on said guide rod;
   a motor disposed at one side of said sensor;
   a gear set comprising a plurality of gears, a transmission wheel, and at least an idle wheel, said gear set being connected to said motor;
   a belt passing through between and contacting said transmission wheel and said idle wheels; and
   a plurality of clamping seats comprising a first belt clamping seat and a second belt clamping seat formed on said base by means of mold ejection, and an elastic clamping seat disposed adjacent to said second belt clamping seat;
   wherein said belt is fixed on said base by one end clamped between said first belt clamping seat and said base and the other end elastically clamped between said second belt clamping seat and said elastic clamping seat.

2. The self-propelled image read module as claimed in claim 1, wherein said sensor is a charge-coupled device or a contact image sensor.

3. The self-propelled image read module as claimed in claim 1, wherein a guide rack is disposed at a bottom of said sensor, and said guide rack has an inverse V-shaped bottom and is placed on said guide rod.

4. The self-propelled image read module as claimed in claim 1, wherein said plurality of gears of said gear set comprises a first gear, a second gear, and a third gear; said first gear is connected to said motor; said second gear, said third gear, said transmission wheel, and said idle wheel are pivotally disposed on said sensor; said second gear meshes said first gear; said third gear also meshes said second gear; said transmission wheel and said third gear are coaxially disposed; and a predetermined gap is preserved between said idle wheel and said transmission wheel to be passed through by said belt.

5. The self-propelled image read module as claimed in claim 1, wherein said belt is parallel to said guide rod.

* * * * *